United States Patent [19]

Torborg, Jr.

[11] Patent Number: 5,010,515

[45] Date of Patent: Apr. 23, 1991

[54] PARALLEL GRAPHICS PROCESSOR WITH WORKLOAD DISTRIBUTING AND DEPENDENCY MECHANISMS AND METHOD FOR DISTRIBUTING WORKLOAD

[75] Inventor: John G. Torborg, Jr., Carlisle, Mass.

[73] Assignee: Raster Technologies, Inc., Westford, Mass.

[21] Appl. No.: 581,401

[22] Filed: Sep. 11, 1990

Related U.S. Application Data

[63] Continuation of Ser. No. 78,874, Jul. 28, 1987, abandoned.

[51] Int. Cl.$^5$ ............................................. G06F 15/16
[52] U.S. Cl. .................................. 364/900; 364/926.1; 364/931.4; 364/935.4; 364/518
[58] Field of Search ........ 364/518, 520, 200 MS File, 364/900 MS File

[56] References Cited

U.S. PATENT DOCUMENTS

| | | |
|---|---|---|
| 4,172,284 | 10/1979 | Heinrich et al. ..................... 364/200 |
| 4,321,666 | 3/1982 | Tasar et al. .......................... 364/200 |
| 4,373,183 | 2/1983 | Means et al. ......................... 364/200 |
| 4,853,877 | 8/1989 | Parkhurst et al. ................... 364/520 |

*Primary Examiner*—Dale M. Shaw
*Assistant Examiner*—Mark K. Zimmerman
*Attorney, Agent, or Firm*—Hale and Dorr

[57] ABSTRACT

An interactive 3-dimensional computer graphics display system has an arbitrary number of parallel connected graphic arithmetic processors (GAPS) coupled to an applications processor through a display list management module and coupled to an image memory unit that generates video output. High level commands from the applications processor are distributed for substantially equal temporal processing among the GAPS by delivering the commands to that GAP which is most ready to receive the next command. Each GAP has a FIFO input memory. A plurality of priority levels are established related to GAP FIFO input emptiness. An additional priority scheme is established within each FIFO emptiness level using a daisy-chained grant signal. A command bus includes dedicated lines for control signals between the GAPs to signal the priority and to pass along the grant signal. Sequentiality of the output from the GAPs is maintained by codes included in command headers and monitored by special tag FIFO memories resident on each GAP, which maintain an entry for each sequential command executed by any of the GAPs. The entry indicates that the command is sequential, and whether it is being executed by the GAP upon which the tag FIFO resides. A GAP output controller signals to all other GAPs when it has reached the stage where the next command it will send is a sequential command.

31 Claims, 10 Drawing Sheets

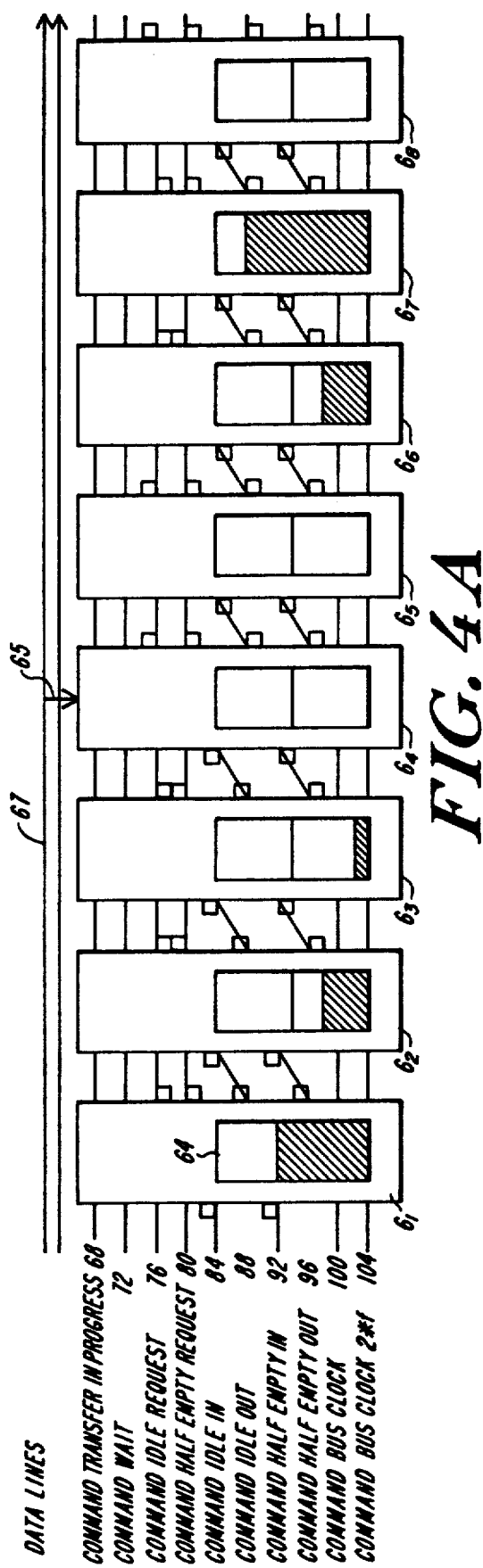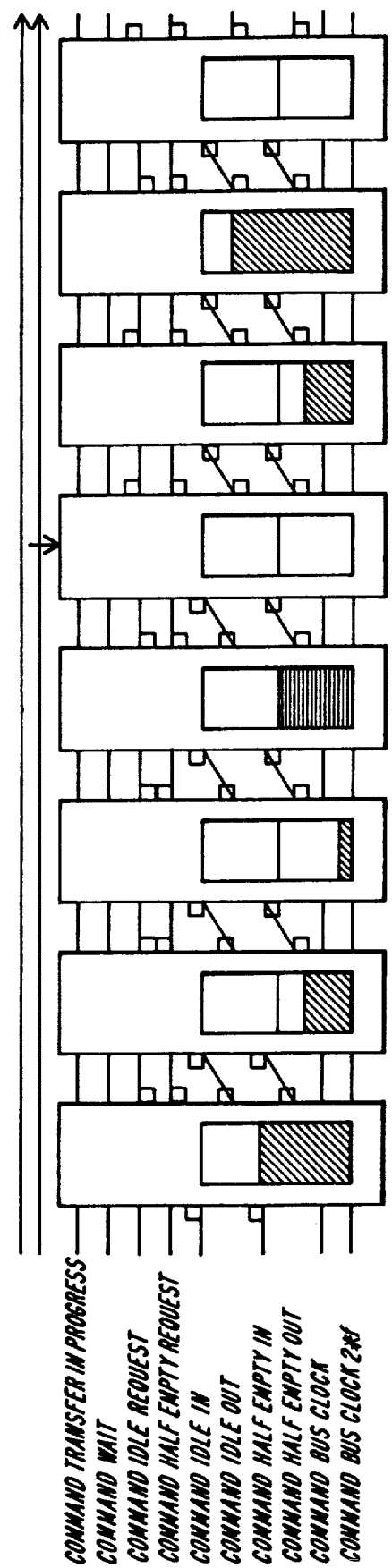

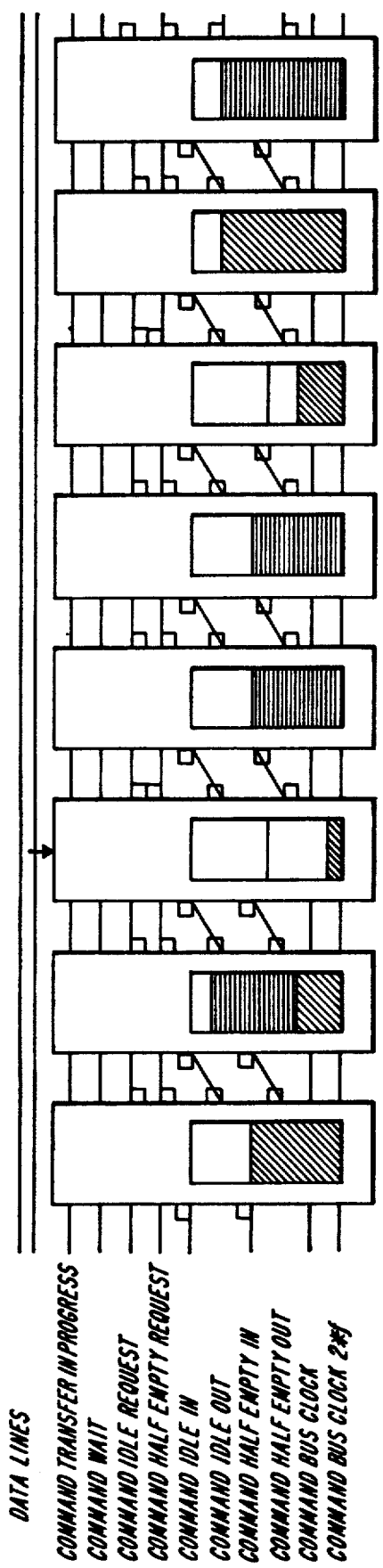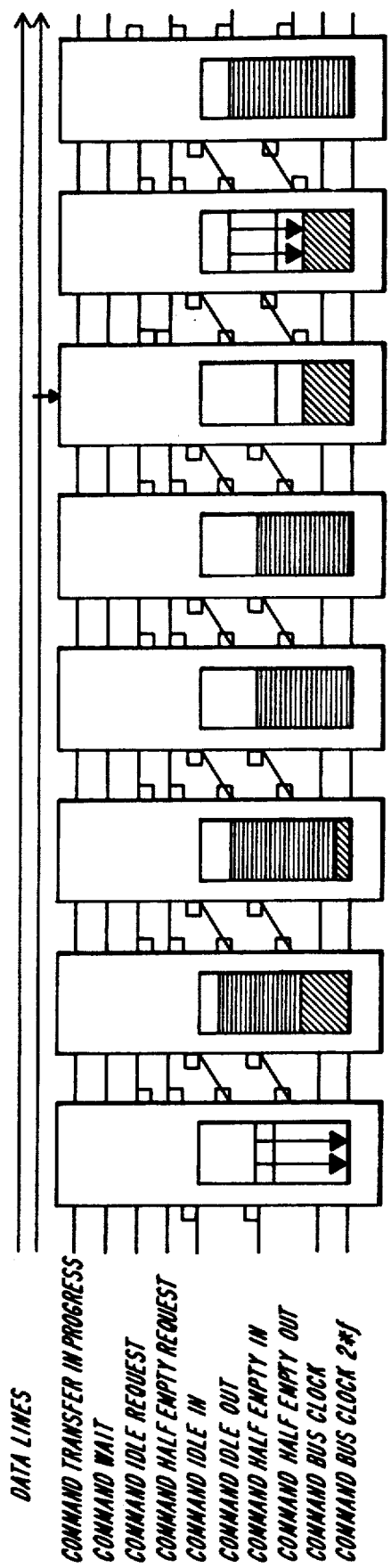

| THIS GAP | SEQ? | ID |
|---|---|---|
| 0 | 1 | J |
| 1 | 0 | I |
| 1 | 1 | H |
| 0 | 1 | G |
| 0 | 1 | F |
| 1 | 1 | E |
| 0 | 1 | D |
| 1 | 0 | C |
| 0 | 1 | B |
| 1 | 1 | A |

130

| ID | IMU COMMANDS |
|---|---|
| 1 | |
| H | |
| E | |
| C | |

| THIS GAP | SEQ? | ID |
|---|---|---|
| 1 | 1 | L |
| 0 | 1 | K |
| 0 | 1 | J |
| 1 | 0 | I |
| 1 | 1 | H |
| 0 | 1 | G |
| 0 | 1 | F |
| 1 | 1 | E |
| 0 | 1 | D |
| 1 | 0 | C |

130

| ID | IMU COMMANDS |
|---|---|
| L | |
| I | |
| H | |
| E | |
| C | |

| THIS GAP | SEQ | ID |
|---|---|---|
| 0 | 1 | M |
| 1 | 1 | L |
| 0 | 1 | K |
| 0 | 1 | J |
| 1 | 0 | I |
| 1 | 1 | H |
| 0 | 1 | G |
| 0 | 1 | F |
| 1 | 1 | E |
| 0 | 1 | D |

| ID | IMU COMMANDS |
|---|---|
| L | |
| I | |
| H | |
| E | |

FIG. 8E

| THIS GAP | SEQ | ID |
|---|---|---|
| 1 | 0 | N |
| 0 | 1 | M |
| 1 | 1 | L |
| 0 | 1 | K |
| 0 | 1 | J |
| 1 | 0 | I |
| 1 | 1 | H |
| 0 | 1 | G |
| 0 | 1 | F |

| ID | IMU COMMANDS |
|---|---|
| N | |
| L | |
| I | |
| H | |

FIG. 8F

| THIS GAP | SEQ | ID |
|---|---|---|
| 0 | 1 | P |
| 0 | 1 | O |
| 1 | 0 | N |
| 0 | 1 | M |
| 1 | 1 | L |
| 0 | 1 | K |
| 0 | 1 | J |
| 1 | 0 | I |
| 1 | 1 | H |

| ID | IMU COMMANDS |
|---|---|
| N | |
| L | |
| I | |
| H | |

PARALLEL GRAPHICS PROCESSOR WITH WORKLOAD DISTRIBUTING AND DEPENDENCY MECHANISMS AND METHOD FOR DISTRIBUTING WORKLOAD

This is a continuation of copending application Ser. No. 07/078,874 filed on Jul. 28, 1987 now abandoned.

BACKGROUND OF THE INVENTION

This invention relates generally to the field of computer-aided design and graphics. It relates specifically to an apparatus for generating graphics using an arbitrary number of parallel processors, thereby providing very fast graphics processing and displaying features.

The co-pending, co-assigned applications entitled "Sequential Access Memory System", U.S. Ser. No. 07/078,872, now abandoned, and "Memory Address System", U.S. Ser. No. 07/078,873 now abandoned, disclose systems for storing and addressing and accessing pixel data for the pixels of a raster or other display suitable for use with the disclosed invention, and these two applications are hereby incorporated herein by reference.

Interactive 3-D graphics applications now constitute a significant portion of computer-aided design techniques. Using interactive graphic applications an operator manipulates complex models of objects and other graphical representations. Providing realistic rendering of the models and of complex operations upon them, requires a very large amount of arithmetic processing. For example, it is desirable to depict a complex object, such as an automobile; to rotate any image of the object about an axis; to depict shading of object surfaces based on a light source at any location; to cut a section of the object along any plane and display an image of that cross section; and to show a 3-D wire frame image of the object.

Current semi-conductor technology cannot provide the processing power required for these interactive graphics manipulations with a single processor system. Some form of multiprocessor architecture is required.

A typical computer graphics system consists of a computer with peripherals, including disk drives, printers, plotters, etc. and a graphics terminal. A typical graphics terminal consists of a high resolution video display screen, user input devices including a keyboard and mouse and a graphics controller. The graphics controller accepts high level graphics commands generated by the computer, in part in response to user input and generates low level commands to control the display, at the pixel to pixel level.

Dedicated graphics arithmetic processors ("GAPs"), may be used to translate the high level commands to low level commands. Multiple parallel processing GAPs may provide the multi-processing required to achieve the desired speed for interactive use. In order to function properly, an architecture using multiple parallel GAPs must accomplish at least three goals. First, the architecture must process order-dependent commands in the proper order. Second, the architecture must efficiently allocate commands to whichever GAPs are most ready to handle the commands. Finally, the architecture should distribute order dependent commands equally among the GAPs to minimize transmission time of a series of consecutive commands.

Turning to the first goal, it is readily understood that in graphics processing, certain groups of commands must be executed by the graphics controller in a specific order, while other groups of commands may be executed, within limits, according to an arbitrary order. For example, a command to change the color in which the next drawn image will be displayed on the graphics screen must be executed in the proper order; i.e., after completion of the drawing of the previous image and before drawing of the next image. If the command were executed after the next image had been drawn on the screen, it would be impossible to change the color of that image without redrawing the entire image. Thus, the command to change the color must be processed before any commands to draw the image. Similarly, any command which affects the appearance of a pixel on a screen, such as intensity or shade, whether a pixel will show through overlapping pixels, etc., must be executed in its proper order. Transformations from one viewpoint to another provide another example of order dependent commands. The command to change a viewpoint must be processed before processing the commands to calculate the appearance of an object image as seen from the new viewpoint. Generally, a command is order dependent if it is important that either: it be executed after another specific command or that it be executed before another specific command.

Many types of commands are not order dependent. For instance, an image of an object, such as a wire frame drawing, may consist of a large number of vectors. It does not matter which of the many vectors are drawn first, or in what order, so long as after they have all been drawn, the entire image is present in its proper form.

The second and third goals are related. GAP architecture requires satisfaction of the second. A GAP, described more fully below, includes a graphics command input memory, organized on a first-in, first-out ("FIFO") scheme. The GAP input FIFO typically can hold more than one command. However, commands may be rather large. If the system attempts to load a command into a GAP having available in its input FIFO less than the required amount of space, the system will need to reload the command into another GAP or to stall while the GAP reduces the contents in its GAP input FIFO by processing commands already stored there. Thus, it is desirable to provide a mechanism that will evaluate the capacity of each GAP to accept commands, thereby avoiding delays.

The multiprocessor arrangement requires satisfaction of the final goal. If the order dependent commands are not distributed substantially equally among the GAPs, it may be that one GAP will be assigned to process a string of consecutive commands. In that case, it will take longer to transmit the results of the command execution from the GAP to the image memory unit because the GAP must process each one. If a number of GAPs have processed the sequential commands essentially simultaneously, it is only necessary to wait while each GAP transmits the results, rather than waiting while the same GAP processes each command and transmits the results in series.

One known method to accomplish the goal of ordering commands is to require that all GAPs stand idle while order dependent processing takes place and the results of the order dependent processing are sent to image memory. This approach results in low efficiency, because the non-processing GAPs sit idle during times when they need not be.

With respect to the command allocation goals, if all commands delivered to any GAP took the same processing time, a round robin command distribution would function efficiently. By "round robin," it is meant that each GAP is assigned a position in a command receipt cycle, and receives commands in order. Commands would always go to a designated GAP, following the GAP designated as preceding it in the command chain. However, command processing time does vary, depending on the complexity of the command. Thus, in a round robin system, it would be possible that when a GAP's turn to process came around, it would still be processing commands from the preceding cycle and would not be ready to accept additional commands. In that case, all GAPs must wait until the designated GAP becomes ready.

It might also be possible for each GAP to assert an idle signal and a GAP input FIFO half empty signal. The signals might be sent to a central prioritizer. This system could work for two or three GAPs. However, for a greater number of GAPs, the number of required signal lines would become prohibitive.

Thus, several objects of the invention include, to provide an apparatus for multiple GAP processing that maintains the order dependence of commands, distributes commands equally among GAPs and to the GAP most ready to receive them without degrading operation speed.

BRIEF DESCRIPTION OF A PREFERRED EMBODIMENT OF THE INVENTION

The invention improves interactive 3-D graphic display by providing an arbitrary number of parallel configured GAPs, coupled to an application processor through a display list management module, and coupled to an image memory unit that generates video output. As described in greater detail below, a preferred embodiment of the invention maintains sequentiality of the output from the GAPs by codes included in command headers and monitored by special FIFO files of each GAP. A preferred embodiment of the invention efficiently distributes high level commands to whichever GAP is most ready to handle them by establishing FIFO emptiness priority levels. The apparatus also uses a daisy chained grant signal which permits establishing additional priority levels within a single FIFO emptiness priority level. A command bus includes dedicated lines for control signals to signal the priority and pass along the grant signal. The invention may be implemented in either a hardware or a software embodiment. The following description describes a primarily hardware embodiment.

A preferred embodiment of the invention accomplishes the goal of maintaining the proper sequence of order dependent commands, also referred to below as "sequential" commands, in the design of each GAP. Each GAP includes a command bus input controller, a GAP input FIFO, as has been mentioned above (which FIFO has an input and an output), a prefetcher, a processor core (the programmable processor that actually executes the commands), a GAP output FIFO (which FIFO has an input and an output), an IMU bus output controller, and two small tag FIFOs: one, a two-bit IMU FIFO and the other a one-bit VME FIFO. Each GAP also contains several other components not important for the present discussion.

The display list management module generates a set of commands for creating and manipulating representations of graphic objects. The set of commands is referred to as the "display list." When the processor on the display list management module, the display list management processor, reads through the display list according to an order specified by the applications processor, it is said to "traverse" the list. Each command generated by the display list management processor includes a header as its first word. (Commands are divided into 32 bit units called "words.") The header includes information about the command, including whether the command must be executed sequentially. As an example, instructions that define a polygon constitute a single command.

As a result of the command arbitration discussed below, a specific command will be delivered to a specific GAP. The delivered command is loaded into the GAP input FIFO of the receiving GAP. Every other GAP also receives the header for every sequential command, even though the other GAPs will not process that command. The GAP loads the header into its GAP input FIFO. Thus if the delivered command is sequential, all GAPs will receive its header, and each header will be considered a delivered command by each GAP.

At the receiving GAP, the header is clocked into the GAP input FIFO according to its proper sequence in the original display list. The command bus input controller adds two control bits to each header as it places the header into the GAP input FIFO. One bit indicates that the word is a header and the second bit indicates whether the header is part of a command to be executed by the receiving GAP.

The prefetcher fetches commands from the output of the GAP input FIFO. As it fetches the commands, the prefetcher determines whether or not the command is sequential, and whether the command is to be executed by the receiving GAP. Based on these conditions, the prefetcher loads an entry into the input of the two bit IMU FIFO. One bit is set if the delivered command is sequential. The other bit is set if the delivered command is to be processed by the receiving GAP. If the delivered command is not to be processed by the receiving GAP, then it is a header of a sequential command to be processed by another GAP. The bits are not set if the conditions are not met. Thus, each GAP contains a sequential record of all sequential commands being executed by all GAPs.

If the delivered command is to be executed by the receiving processor, the prefetcher delivers the command to the processor core. The processor core accepts as input the high level commands passed on by the display list management processor and generates a set of low level image memory unit commands ultimately to produce video output. The processor core writes image memory unit commands into the GAP output FIFO. The first word of each command is a header, which indicates, among other matters, whether the command is the last of a sequence of commands spawned by a single high level command generated by the display list management processor.

The output of the two bit IMU FIFO controls arbitration for the image memory unit ("IMU") bus and thus helps to maintain the proper order of commands put onto the IMU bus. The IMU bus connects each of the GAPs to the image memory unit. The output of the two bit IMU FIFO indicates whether or not it corresponds to commands to be executed by the resident processor.

Taking the case first where the output of the two bit IMU FIFO indicates that the two bit output corresponds to commands to be executed by the processor on the same GAP as the two bit IMU FIFO, the IMU bus output controller evaluates the two bit IMU FIFO with respect to sequentiality. If the IMU FIFO output indicates that the commands are not sequential, the IMU bus output controller waits until a complete command block is available, and then requests the IMU bus to send the commands over the bus. The commands are clocked out of the GAP output FIFO and the tag in the IMU FIFO is clocked out of the two bit IMU FIFO.

Still considering the case where the output of the two bit IMU FIFO indicates that the two bit output corresponds to commands to be executed by the resident, GAP if the IMU FIFO indicates that a sequential command must next be processed, the IMU bus output controller waits until all other GAP IMU bus output controllers have reached the same point in the original display list management processor command stream. Because every GAP makes an entry into its two bit IMU FIFO for every sequential command, regardless of whether that GAP executes that command, every GAP's IMU FIFO indicates a sequential command. Further, because the GAPs wait to synchronize themselves with each other on sequential commands before releasing any sequential commands to the IMU bus, the IMU FIFO entries have been spawned by the same sequential command. Only one GAP's IMU FIFO indicates that the same GAP's processor processed that command. In this case, the GAP under discussion has processed the command. When all of the GAP IMU bus output controllers indicate on the IMU bus that they have arrived at a sequential command, it must be the same command for all GAPs, because this same process has been carried out for every sequential command from the beginning of the command stream. The GAP requests the IMU bus and releases to the IMU bus the group of commands associated with the single display list management processor input command. After completion of the command transfer, every GAP's two bit IMU FIFO outputs are clocked.

Turning now to the case where the output of the two bit IMU FIFO indicates that the two bit output corresponds to commands to be executed by a processor located on another GAP, then the output of the IMU FIFO also must indicate that it is a sequential command next in the command stream. (No entry is clocked into a GAP's two bit IMU, attributable to non-sequential commands to be executed by another GAP.) The IMU bus output controller indicates to the IMU bus that it has arrived at a sequential stage in the command stream, and waits until the IMU bus output controller has received notice that all GAPs have arrived at a sequential stage, which is the same for all GAPs, and that the sequential command has been sent by the IMU bus output controller of the processing GAP.

As can be seen, because each GAP includes a GAP input FIFO and a GAP output FIFO, the processor core can continue to process commands and transfer them into the GAP output FIFO even if the IMU bus controller cannot transmit the processed image memory unit commands over the IMU bus. Thus, the processor processes virtually continuously, regardless of hold-ups at the IMU bus interface while other processors are processing and completing sequential commands.

In some cases, the display list management processor generates commands that require the GAP to generate a response and send it over the VME bus to the applications processor. Responses are always sequential. The sequentiality of the responses is also maintained by using a one bit VME FIFO similar to the two bit IMU FIFO used for maintaining sequentiality of drawing commands.

Turning now to the apparatus of the invention which prioritizes GAPs according to FIFO emptiness, each GAP includes a GAP input FIFO in which to buffer commands received from the display list management module. A GAP is able to determine whether its GAP input FIFO is empty or more than half empty. If the GAP input FIFO is empty, the GAP is idle and will assert a signal on a line designated for this purpose and similarly, if the GAP input FIFO is more than half empty, the GAP will assert a signal on a second designated line. Otherwise, these signals will not be asserted. Each GAP conducts a self-diagnostic to determine it's state of emptiness at a time when no commands are being transferred. As a result, each GAP generates the appropriate signal on the appropriate line.

The apparatus assigns to the GAPs a priority related to their degree of emptiness, with idle GAPs receiving the highest priority, GAPs whose GAP input FIFOs are more than half empty next, and GAPs whose GAP input FIFOs are less than half empty last. GAPs having higher priority will receive commands before GAPs having lower priority. Within each of the three priority categories, the GAP physically closest to the display list management module is of the highest priority; more distant GAPs being of lower priorities.

The GAPs use a pair of prioritized grant signals to establish which GAP will receive the next available command. One signal (the "Command Idle In"), if asserted into the GAP indicates that no GAP of higher priority is waiting to receive commands. Thus, if a GAP receives an asserted Command Idle In signal, and if that GAP is ready to receive commands, it will receive the next command. If the Command Idle In signal is not asserted, then a higher priority GAP is waiting to receive commands and thus the GAP with the non-asserted Command Idle In signal may not receive the next command.

Each GAP controls a companion output signal to the Command Idle In, referred to as the "Command Idle Out" signal. The GAPs are daisy-chained together through the Command Idle In and Command Idle Out signal lines. Thus the Command Idle Out signal of a GAP is the Command Idle In signal of the next GAP. If a GAP does not assert its Command Idle Out signal, this indicates that no GAP having lower priority than that GAP may accept a command. As a result, the Command Idle Out outputs of each lower priority GAP will not be asserted and thus the Command Idle In inputs to all GAPs further away from the display list management module will not be asserted.

A pair of similar signals signal that the FIFO of a GAP is more than half empty, and grant a half empty signal down the priority chain.

As the GAPs are receiving commands, the GAPs are also removing commands from their GAP input FIFOs, and executing them, thereby reducing the number of commands contained in their respective input FIFOs. However, the apparatus prevents a GAP from asserting either the Command Idle Request or the Command Half Empty Request lines until all GAPs that have previously asserted either request on the same clock pulse (referred to below as a "Simultaneous Request Group") have received commands. This mechanism insures that all GAPs simultaneously requesting a command at a given level will receive commands before any other processor can request commands. This feature distributes evenly the consecutive sequential commands in any sequence. That minimizes the time it takes the GAPs to transmit the processed commands, since it is unlikely that any lone GAP will be processing consecutive, order dependent commands.

The invention will be more readily understood with reference to the following discussion and the figures of the drawing.

DETAILED DESCRIPTION OF A PREFERRED EMBODIMENT OF THE INVENTION

Figure 1:
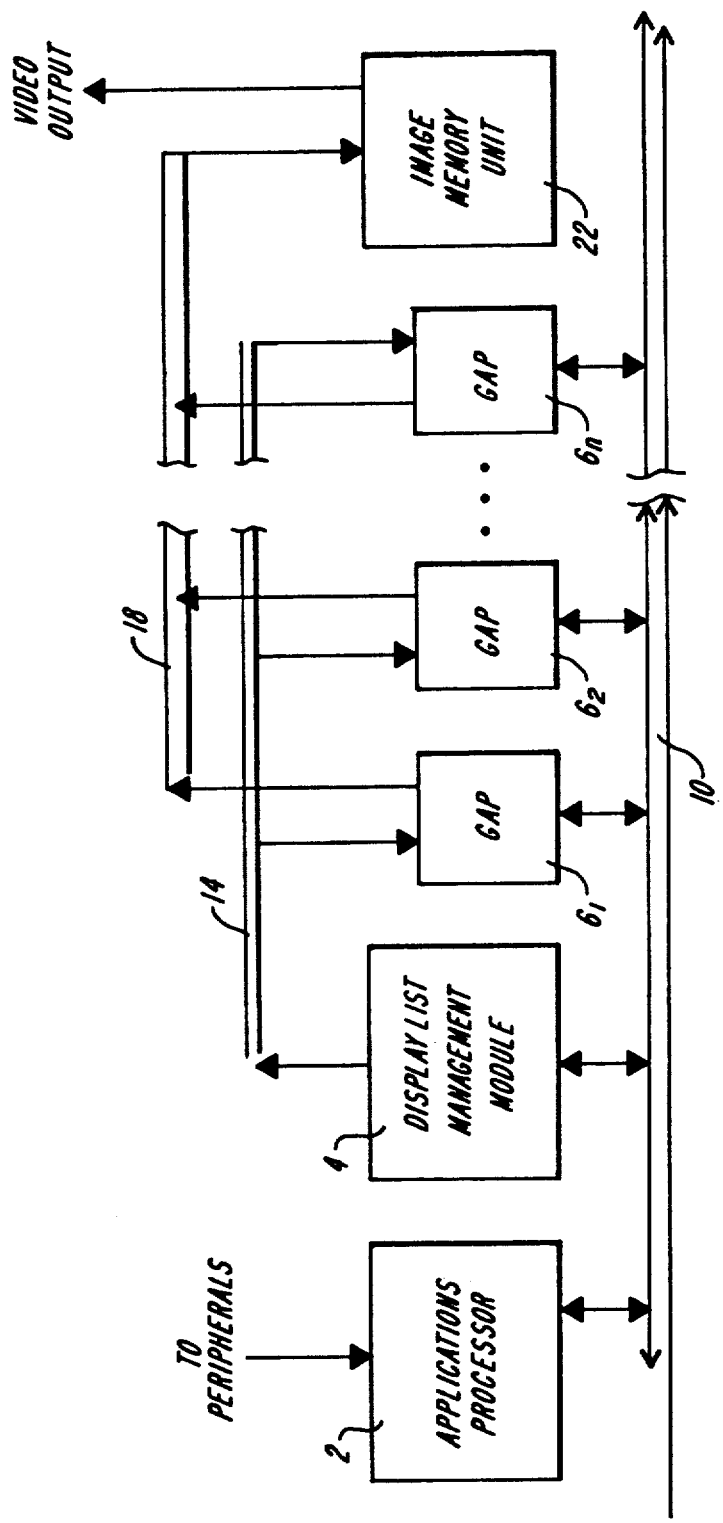
FIG. 1 is an overview of the parallel processor architecture, showing the applications processor, the display list management module, the graphics arithmetic processors (GAPs) and the image memory unit.

A preferred embodiment of the general architecture of a parallel processor apparatus is shown in FIG. 1. An applications processor 2 controls the entire system including peripheral devices (not shown) such as disc drives, printers, plotters, and the operator interface, typically a mouse and keyboard combination. The application processor 2 generates high-level graphics commands. A processor on a display list management module 4 executes memory management commands and passes the high level commands to the graphics arithmetic processors (GAPs) $6_1$-$6_n$. The GAPs shoulder the brunt of the arithmetic operations necessary to generate and draw the various graphic images called for by the user through the peripherals controlled by the applications processor 2.

The applications processor 2 communicates with the display list management module 4 and the GAPs $6_1$-$6_n$ over an industry standard VME bus 10. The display list management module 4 communicates with the GAPs $6_1$-$6_n$ over the command bus 14.

In a preferred embodiment, the command bus includes a 32 bit data bus as well as at least 10 separate control signals. The data bus is unidirectional, all data passing from the display list management module to the GAPs and not vice-versa. Each of the GAPs is connected through an IMU bus 18 to an image memory unit 22, which generates a video output at 26. The IMU bus is a 32 bit multimaster synchronous bus. The video output is displayed on a monitor (not shown) according to known techniques.

Figure 2:
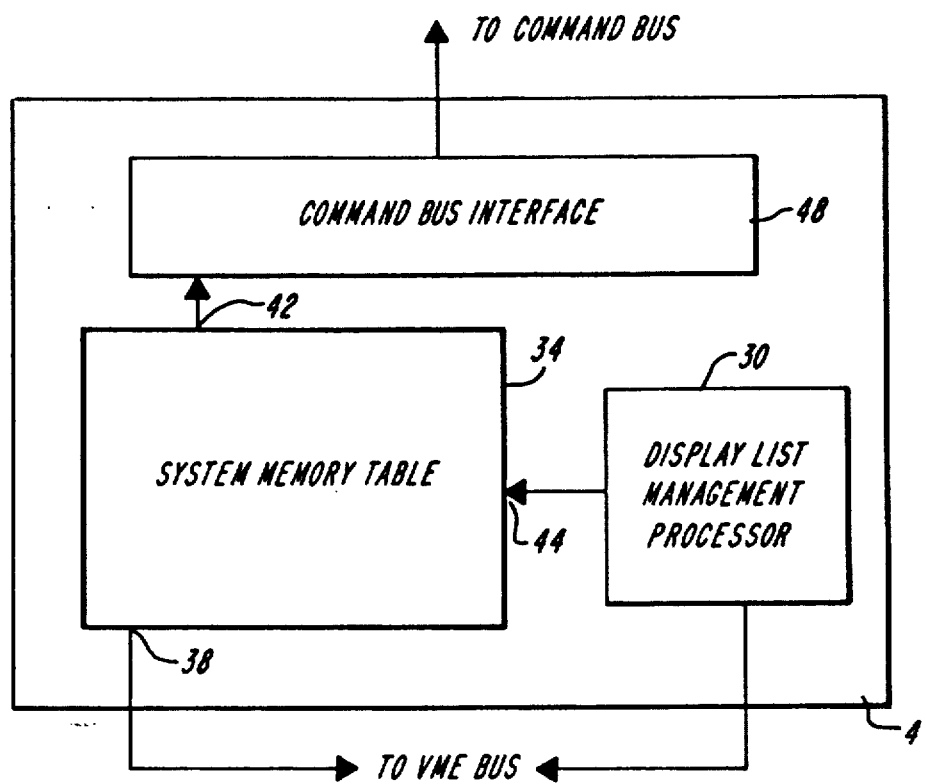
FIG. 2 shows schematically the display list management module and its connections to the command bus and the VME bus.
Figure 3:
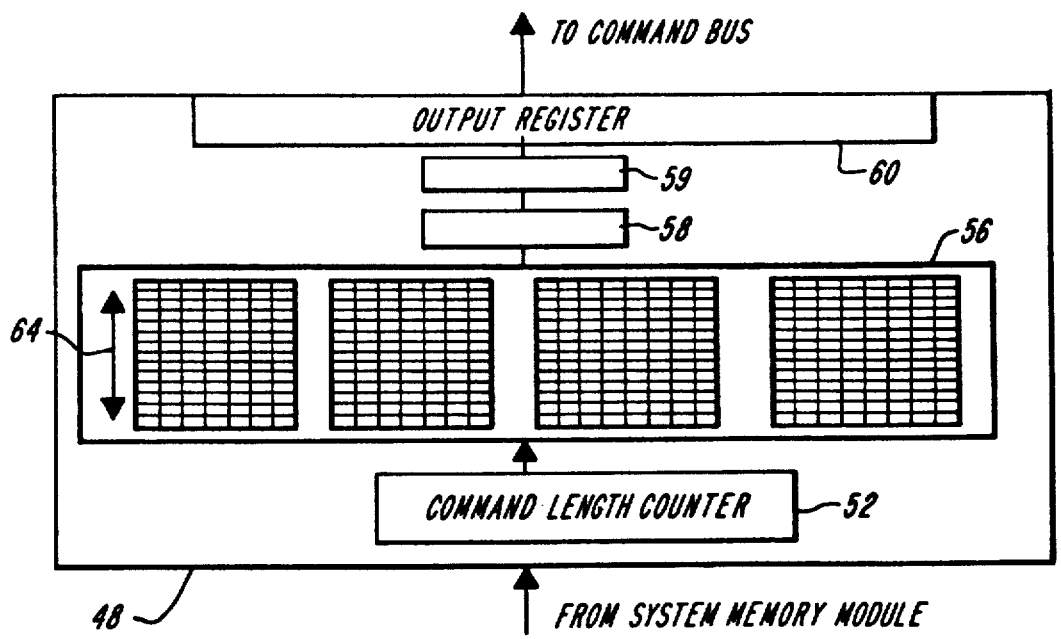
FIG. 3 shows schematically the command bus interface of the display list module.

The display list management module 4 of a preferred embodiment of the invention is shown in FIGS. 2 and 3. The display list management module 4 includes a display list management processor 30. The processor is a 16 bit processor using an ALU with register, function latches, and decode logic to generate control and interface signals. The display list management processor 30 handles various tasks alleviating the applications processor's 2 burden. These tasks include, memory mapping operations for multi-tasking, virtual memory support, organizing the display list memory in convenient units such as blocks and pages, swapping these units between the display list memory and peripheral memory devices, and communication with the GAPs 6.

A display list memory 34 also resides on the display list management module 4. In a preferred embodiment, the display list memory 34 encompasses 32 megabytes of parity protected dynamic RAM implemented as four depopulatable 8 megabyte banks. The display list memory has three ports 38, 42, and 44, which communicate with the VME bus 10, the command bus 14, and the display list management processor 30 respectively.

The applications processor 2 generates a display list that resides in the display list memory 34. The display list consists of graphics commands representing structures which will be transformed into commands executed ultimately by the image memory unit 22. The commands include three basic types. The first type includes commands that identify and set the parameters for graphics primitives, such as vectors, circles, triangles and text. The primitives fall into broad categories. For instance, curves (which include vectors) constitute one category of primitives. Text constitutes another primitive category and polymarkers (stock marker symbols such as circles, stars, bullets, etc.) constitute another category. The second type of command includes commands that affect the way the GAPs will process graphics commands. These commands include those directing a change of coordinate system, or a change of the color of pixels, or the pattern displayed. The final type of graphics command includes those which actually affect the structure of the display list. These commands include those to start or stop accumulation of commands into a structure, or which refer to another structure resident on the display list memory 34.

The American National Standard Institute ANSI has proposed a graphics standard called the Programmer's Hierarchical Interactive Graphics Standard (PHIGS). A preferred embodiment of the invention has been designed to run an extended version, known as PHIGS+. The extensions provide shading, hidden surface removal, lighting models, arbitrary clipping planes, 3D curves and surfaces, and depth cuing. Specifications for PHIGS+ are available from Raster Technologies, Inc., Two Robbins Road, Westford, Mass. 01886.

As an example, in response to operator input, the applications processor 2 may generate structures representing a group of objects representing building blocks sitting on a table—for instance, a cube, a rectangular box and a triangle. Each structure will have a location, based on a known coordinate system, an orientation, and a color. Further, light-related characteristics such as shade and shadow may also be generated. A record of these structures is generated by the applications processor 2 and stored in the display list memory 34. The operator might desire to view the building blocks from another angle, such as directly overhead. The operator communicates this desire through the peripheral devices, which desires are translated by the applications processor 2 to commands and passed on to the display list management processor 30. The display list management processor 30 identifies the structures from the display list memory 34 and applies the commands generated by the applications processor 2 to the structures. The calculations necessary to generate the commands to display the building blocks from the new point of view are accomplished by the parallel GAPs $6_1$-$6_n$.

The display list management processor 30 sends high level graphics commands generated by the applications processor 2 and stored in the display list memory 34 to the series of parallel GAPs $6_1$-$6_n$ over the command bus 14. A command bus interface 48, shown schematically in FIG. 3, provides the link between the display list management processor 30 and the command bus 14.

Figure 6:
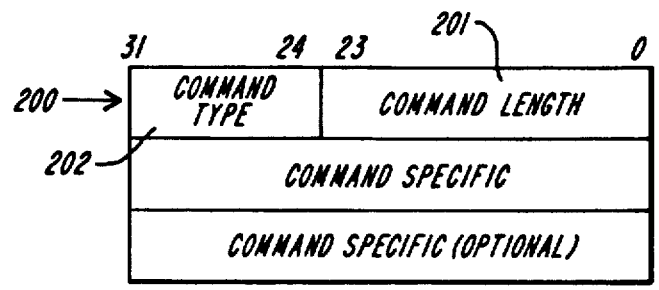
FIG. 6 shows schematically the form for a command generated by the display list management processor.

The display list management processor 30 transmits commands, shown schematically in FIG. 6. The commands are long word (32 bit) aligned and contain an integer number of long words. The first long word in each command is a header 200, which contains information used by the command bus interface 48. The first 24 bits 201 of this header (bits 0-23), specify the length of the command in long words, not including the header. The last eight bits (bits 24-31) of the header 200 constitute a command-type segment 202, shown more fully in FIG. 7.

A bit 208 (bit 24) specifies whether or not the system is in "pick" mode. Pick mode is a mode the system enters while waiting for the operator to "pick" or select a structure or group of structures from the screen, for instance by pointing to an object with the cursor.

A bit 210, (bit 25), identifies commands not relevant for the implementation of the present invention. A field 214 of three bits (bits 26-28) indicates whether the receiving processing GAP must synchronize processing with other GAPs when accessing the IMU 14 and VME 10 busses. Field 214 also specifies when a command is potentially sequential, that is, when the command may be sequential, depending upon conditions then set in the GAP core. Treatment of a potentially sequential command is discussed below. Alternatively, when a command must be sent to a specific GAP, as specified by a GAP-mode field 218 (discussed below) field 214 specifies the number of the GAP (e.g. $6_n$) to which the command must be sent. Ideally, these two functions of field 214 could be performed by different fields, however that would require a longer header.

Finally with respect to the four fields of the command-type segment 202 of the header 200, the field 218 determines the GAP distribution mode, which determines how commands will be distributed by the display list management processor 30 to the GAPs. In most cases, the distribution mode field 218 will indicate that the GAPs themselves will arbitrate and determine which GAP receives the command. In some cases, however, it is desirable to send a command to a specifically addressed GAP, or to all GAPs. Commands that are sent to all GAPs are those that change the state in which the GAP processor must operate. Examples include transformations such as change of view, scaling and light manipulation commands. Commands which change the clipping plane are also sent to all GAPs. Field 218 is also used to specify certain commands that cannot be processed by the GAPs and therefore ought to be ignored by all GAPs. Field 218 also is used to signal that a command marks the beginning of a different primitive type, from the primitive type most recently handled. The beginning of a new primitive type is always a sequential command, because different primitives are usually displayed in a different color.

Turning now to a detailed examination of the command bus interface 48 which is shown in FIG. 3, commands are directed by the display list management processor 30 from the display list memory 34 to the command bus interface 48. A command length counter 52 is loaded with the length of each command as the header 200 is read through. As each additional long word of the command is read from the display list memory 34, the command length counter 52 is decremented. When the entry in counter 52 reaches zero, the next long word is a command header.

A display list management module FIFO 56 buffers command words as they are read from the display list memory 34. The FIFO 56 of the preferred embodiment is implemented using four nine bit wide FIFO's of 64 entries in length, providing a total width of 36 bits, two of which are not used for the command word. The two additional used bits, which accompany each command word, indicate whether the data word is a header, and also whether the system is in pick mode.

A pair of programmable array logic chips 58, 59 (PAL) alter certain bits in the header, based on the two control bits mentioned above. The PAL 58 sets the pick mode bit 208 if the pick mode control bit is set in the entry of the display list management module FIFO 56. The PAL 59 forces the GAP distribution mode 218 and sequential command 214 fields to the appropriate value to indicate a sequential command, when a command for a new primitive type is processed.

The FIFO 56 allows command data to be read from the memory 34 at 20 megahertz, which is twice the rate the command bus 14 can receive data. This provides enough memory bandwidth so that the display list management processor 30 and the application processor 2 can continue to manage the display list while the commands are transmitted onto the command bus 14.

Figure 5:
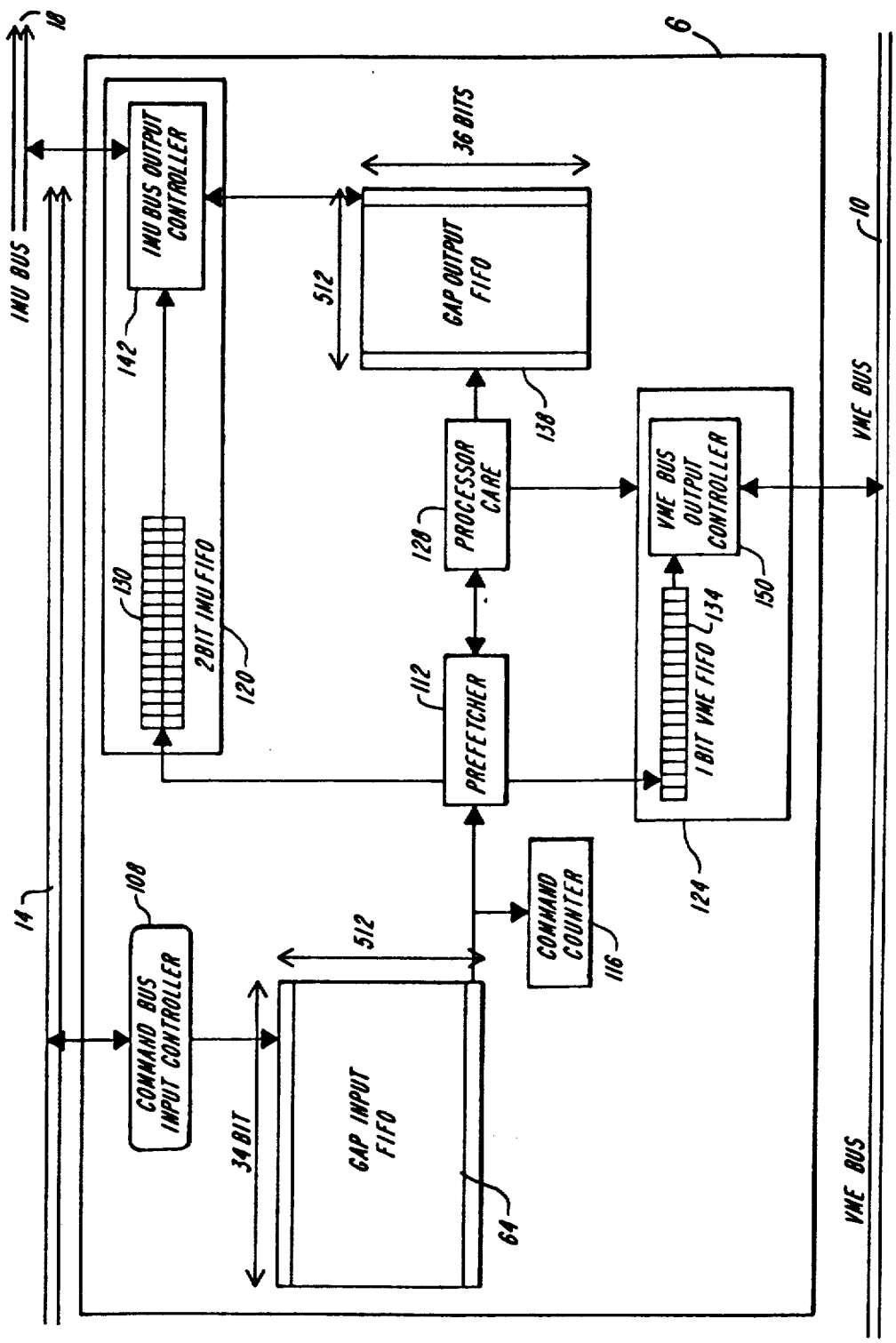
FIG. 5 shows schematically the architecture of one graphics arithmetic processor (GAP).

Commands are clocked from the output of the FIFO 56, through the PALs 58, 59, to an output register 60 every one hundred nanoseconds if data is available from the FIFO and if the receiving GAP accepted the previous command. If the GAP did not accept the command, then the receiving GAP has a full GAP input FIFO 64 (FIG. 5). Commands are not clocked out again until the GAP input FIFO 64 reduces its contents. The output register 60 is 32 bits wide.

The apparatus by which the GAPs arbitrate among themselves for commands is shown schematically in FIGS. 4A-4G. Referring briefly to FIG. 1, the display list management module 4 communicates with the GAPs $6_1$-$6_n$ over the command bus 14. The command bus 14 includes a thirty-two bit uni-directional data bus. Data passes only from the display list management module 4 to the GAPs $6_1$-$6_n$. The command bus 14 also includes additional control lines upon which travel signals for and generated by the GAPs. In a preferred embodiment, data can be transferred synchronously on the data bus 14 at a maximum data rate of 40 megabytes per second.

The GAP arbitration apparatus will now be described in detail. FIGS. 4A-4G show schematically a daisy chain arrangement whereby the command bus 14 and control lines communicate with each GAP $6_n$. In the FIGS. 4A–4G, the data lines 67 of the command bus 14 are shown as a double line at the top of each figure. In these figures, eight GAPs $6_n$ are shown. Each GAP $6_n$ is equipped with a GAP input FIFO 64, also shown schematically in FIG. 5. The GAP input FIFO 64 is a 34 bit wide, 512 register deep FIFO. Each GAP input FIFO 64 is shown schematically with a horizontal line at mid-height. This half full marker is provided only for illustration purposes.

As has been mentioned above the GAPs arbitrate commands among themselves by a three level GAP arbitration priority ranking. According to this ranking, idle GAPs, that is GAPs which have no commands in the GAP input FIFO 64, have the highest priority. GAPs having higher priority will receive commands before GAPs having lower priority. In FIG. 4A, the fourth GAP, identified by $6_4$ is idle, as shown schematically by the empty GAP input FIFO 64. The second category of GAP arbitration priority are GAPs that are more than half empty, that is for which fewer than 256 of the 512 FIFO registers are full. In FIG. 4A, gaps $6_2$, $6_3$, and $6_6$ are more than half empty, shown schematically by the shaded portion which does not extend up to the half full marker. The lowest GAP arbitration priority of readiness is less than half empty. GAPs $6_1$ and $6_7$ have GAP input FIFO's 64 which are less than half empty, again as indicated by the shaded portion.

According to the GAP arbitration apparatus, a GAP whose FIFO 64 is more then half full will never receive commands. This protects against a situation where a GAP attempts to receive a command that is larger than the available FIFO space. In that case, the transmission would stop and the command bus 14 would be tied up pointlessly while the GAP reduces the contents in its input FIFO 64. This prevents one processor from tying up the command bus when other processers may be idle. Although there may be commands that are larger than one-half of a GAP FIFO, that situation will be rare.

Each GAP $6_n$ has a command bus input controller 108, as shown in FIG. 5. Turning to FIG. 4A, each of the control lines of the command bus is shown schematically as a line passing from GAP to GAP. It will be understood that the control lines run between the command bus input controllers 108 of each GAP. For simplicity in FIG. 4, no schematic representation of the command bus input controllers has been shown. A command bus clock 100 is used to synchronize all operations on the command bus 14. In a preferred embodiment, the clock is a ten megahertz clock. A command bus clock 2*f 104 is synchronized with command bus clock 100.

Signals will be asserted on control lines (identified below) depending on the state of commands on the data lines 67 and the state of each GAP, as explained below. In FIGS. 4A–4G, an asserted signal on a line is indicated by a small rectangle located above the line and a non-asserted signal is indicated by a small rectangle located below the pertinent line. For instance, to the left of GAP $6_2$, the signal Command Idle In 84 is asserted. Immediately to the right, or downstream from GAP $6_1$, the signal Command Idle Request 76 is not asserted. (It should be noted that signals may be asserted either high or low. The apparatus of the present invention employs signals asserted as both high and low. Further, in the following discussion, it will be understood that circuitry of the command bus input controller 108, on the GAP, handles the signals discussed below, although for simplicity, the following discussion frequently refers simply to the GAPs.)

A signal Command Transfer In Progress 68 is asserted (low) for the duration of a command transfer on the command bus. It is asserted on the clock cycle on which the first word of a command is transferred and is de-asserted following the clock cycle in which the last word of the command is transferred.

A signal Command Wait 72 is an open collector signal that is asserted (low) by either the display list management processor 4 or one or more GAPs which are receiving the data stream to indicate that the data on the command bus is not valid or cannot be received by the GAPs.

The GAPs use the remaining control signals to arbitrate command allocation among themselves. A Command Idle Request signal 76 is asserted (low) by circuitry in the command bus input controller 108 of a GAP $6_n$ to indicate that it is idle and is ready to execute a command. A GAP will assert this Command Idle Request 76 signal on the rising edge of a command bus clock pulse if it is idle and if the Command Idle Request signal 76 is currently not asserted. (If the Command Idle Request signal 76 is currently not asserted, this means that no GAPS have asserted this signal and therefore, no GAPS were idle upon the immediately preceding clock pulse.) The Command Idle Request signal 76 may be conveniently implemented by using an open collector signal that is wire--ORed.

It is possible for several GAPs to assert the Command Idle Request signal 76 on the same clock pulse. In that case, each GAP will continue to assert the Command Idle Request signal 76 until that GAP has been serviced with a command. Each of these GAPs will be serviced before any additional GAPs can assert this signal, because as the GAPs maintain the assertion of Command Idle Request 76, no other GAP will be able itself to assert the Command Idle Request 76. The group of GAPs that assert this signal together is referred to below as a "Simultaneous Request Group." As shown in FIG. 4A, GAPs $6_4$, $6_5$, and $6_8$ have all asserted the Command Idle Request signal 76. The apparatus provides that commands will be received by all GAPs in a Simultaneous Request Group before being received by any GAPs that have become half empty or idle during the servicing of other GAPs in the Simultaneous Request Group, to insure that sequential commands are evenly distributed among the GAPs. This speeds up processing, since it will be unlikely that two sequential commands will be processed by the same processor. Thus, they can be processed simultaneously, and then sent to the IMU bus 18 for treatment by the image memory unit 22 in the proper order.

Signals Command Idle In 84 and Command Idle Out 88 work together in a daisy chain scheme to establish daisy chain priority levels. The Command Idle In 84 is an input to the command bus input controller 108 of a GAP which signal, when asserted (in this case, high), indicates that no higher priority GAPs have asserted the Command Idle Request signal 76. A higher priority GAP is, in the preferred embodiment, a GAP closer to the display list management processor 30. In FIG. 4, the priority of GAPs with respect to this feature is highest on the left and decreases toward the right. When the Command Idle In signal 84 is not asserted, a GAP of higher priority has asserted its Command Idle Request signal 76.

A Command Idle Out signal 96 is provided as an output from the command bus input controller 108 of each GAP, which signal is asserted (high) if the Command Idle In 84 signal is asserted and if the Command Idle Request 76 signal for that particular GAP is not asserted. The Command Idle Out signal of GAP $6_n$ is the Command Idle In signal of GAP $6_{n+1}$, thus forming the daisy chain. In operational terms, if neither a particular GAP nor any higher priority GAP are empty, the particular GAP will "pass on" the "permission" to the next GAP to take the command. The Command Idle Out signal 88 will be not asserted if either a higher priority GAP or a particular GAP have asserted Command Idle Requests 76.

The Command Half Empty Request signal 80 functions identically to the Command Idle Request 76 except that it will be asserted by the command bus input controller 108 of a GAP whose GAP input FIFO 64 is at least half empty. A GAP whose GAP input FIFO is entirely empty and which whose command bus input controller 108 has thus asserted Command Idle Request 76, although technically also having a GAP input FIFO 64 that is more than half empty, will not assert the Command Half Empty Request 80.

Similarly, a Command Half Empty In signal 92 and the Command Half Empty Out signal 96 are provided, which each function similarly to Command Idle In signal 84 and Command Idle Out signal 88 respectively. However, a GAP having its command Half Empty Request signal 80 asserted will not receive a command, even if it is highest in the Half Empty daisy chain priority (that is, if the GAP has Command Half Empty In 92 asserted and Command Half Empty Out 96 not asserted) unless the Command Idle Request signal 76 is deasserted.

Figure 4C:
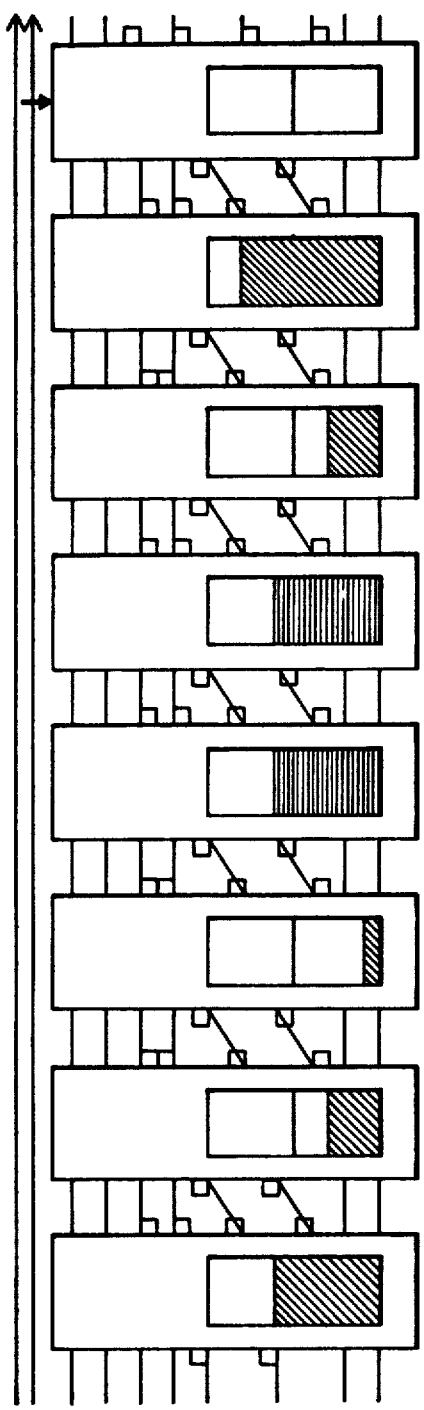
FIG. 4 shows schematically the apparatus for arbitrating commands among the GAPs. This figure is divided into FIGS. 4A-4G, each showing the arbitration apparatus at a different stage during the arbitration process.

The FIGS. 4A–4G illustrate how the arbitration apparatus functions. (Reference numerals have been deleted from FIGS. 4B–4G to avoid unnecessary clutter. The elements are identical to those referenced in FIG. 4A. Only their states have changed.) FIG. 4A shows the states of the arbitration signals 76–96 as a command is being received by GAP $6_4$. As can be seen, the circuitry of command bus input controllers 108 of GAPs $6_4$, $6_5$ and $6_8$ have asserted Command Idle Request 76. They belong to a Simultaneous Request Group and have the same GAP arbitration priority. However, only GAP $6_4$ has received an asserted Command Idle In signal 84, as it has the highest daisy chain priority of the idle GAPs. The circuitry of command bus input controller 108 of GAP $6_4$ has output Command Idle Out 88 not asserted, and therefore the Command Idle In 84 into the command bus input controller 108 of GAP $6_5$ is not asserted so that GAP $6_5$ is unable to accept a command from the data lines 67.

During the time that a command is being received by GAP $6_4$ as indicated by arrow 65, many clock pulses may pass and the processors of each GAP may process many of the commands in the GAPs' input FIFOs 64, thereby reducing the number of commands to empty or more than half empty. However, during the period of command transfer, Command Transfer in Progress Signal 68 has been asserted. The command bus input controllers 108 of the GAPs may not assert the Command Idle Request signal 76 or Command Half Empty Request 80 until the Command Transfer in Progress Signal 68 has been deasserted. The Command Wait signal 72 may be asserted by a GAP receiving a command if, for some reason during receipt, the GAP becomes unable to continue receiving commands. In that case, the display list management processor 30 stalls and does not send commands again until the command bus input controller 108 of the GAP deasserts the Command Wait signal 72.

FIG. 4B shows the state of the GAPs as GAP $6_5$, the GAP in the highest GAP arbitration level and having next highest daisy chain priority at the time of FIG. 4A is receiving a command. In order to simplify the following discussion, the number of instructions in each GAP's GAP command input FIFO 64 has been maintained constant from the step shown in FIG. 4A to the step shown in FIG. 4B. This would not be the case in actual practice. In FIG. 4B, the GAP input FIFO 64 of GAP $6_4$ has been filled, as indicated schematically by the horizontal bars occupying the lower portion of the FIFO 64. As can be seen, the command bus input controller 108 of GAP $6_4$ now has not asserted Command Idle Request 76. Further, the command bus input controller 108 of GAP $6_4$ has asserted Command Idle Out 88, which is also the Command Idle In 84 of GAP $6_5$ so that GAP $6_5$, which is a member of the Simultaneous Request Group and has asserted the Command Idle Request signal 76, may receive the command as indicated by the arrow 65.

Figure 4D:
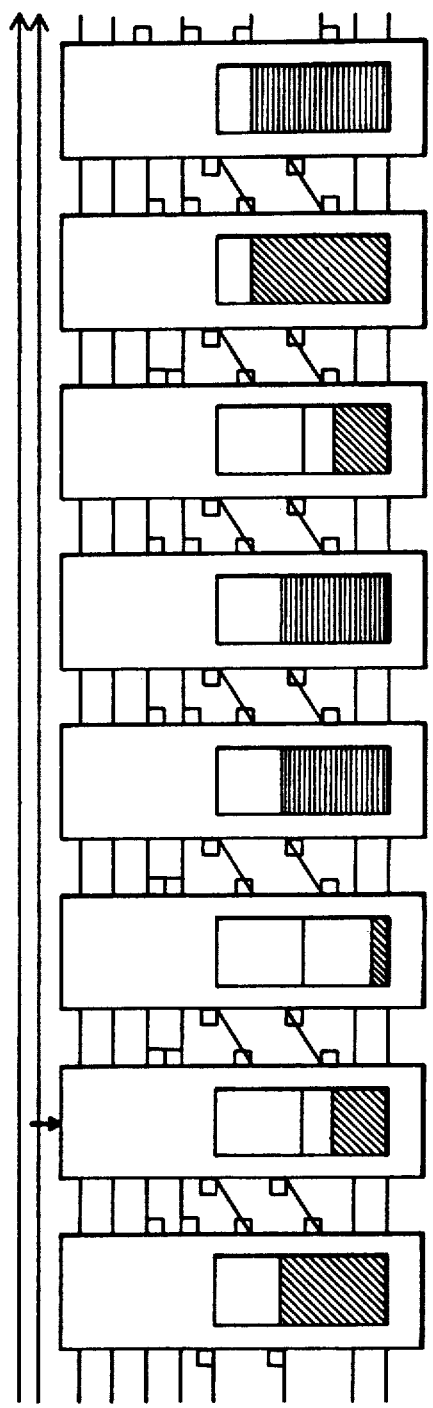

After the last GAP to have asserted Command Idle Request 76 has received a command, and has deasserted its Command Idle Request 76, the line Command Idle Request 76 becomes deasserted and FIG. 4C shows the state of affairs as GAP $6_8$, the idle GAP having the lowest daisy chain priority at the time of FIG. 4A, is serviced. GAPs having the next highest GAP arbitration priority will receive commands. These are GAPs that have asserted Command Half Empty Request 80. FIG. 4D shows the state of affairs as GAP $6_2$, the highest daisy chain priority GAP that has asserted a Command Half Empty Request signal 80, is serviced. GAPs $6_2$, $6_3$ and $6_6$, which asserted the Command Half Empty Request 80 at the pulse shown in FIG. 4A, are also members of the Simultaneous Request Group, all of which will receive commands before any non-member may assert the Command Idle Request 76 or Command Half Empty Request 80. As can be seen in FIG. 4D, no GAP that is not a member of the Simultaneous Request Group has asserted the Command Idle Request signal 76. FIG. 4F shows the state of GAPs when GAP $6_6$, the last GAP of the Simultaneous Request Group, is being serviced.

At some time before GAP $6_6$ was serviced, the GAP input FIFO of GAP $6_1$ has been reduced to empty as indicated schematically by the empty rectangle in the GAP input FIFO 64 and the arrows pointing downward. Similarly, the level of commands in the GAP input FIFO for GAP $6_7$ has been reduced from more than half full to less than half full. It can be seen, however, that GAP $6_1$ has not asserted Command Idle Request 76. This is because all GAPs that were members of a Simultaneous Request Group must be serviced before a new Simultaneous Request Group may be formed.

Figure 4G:
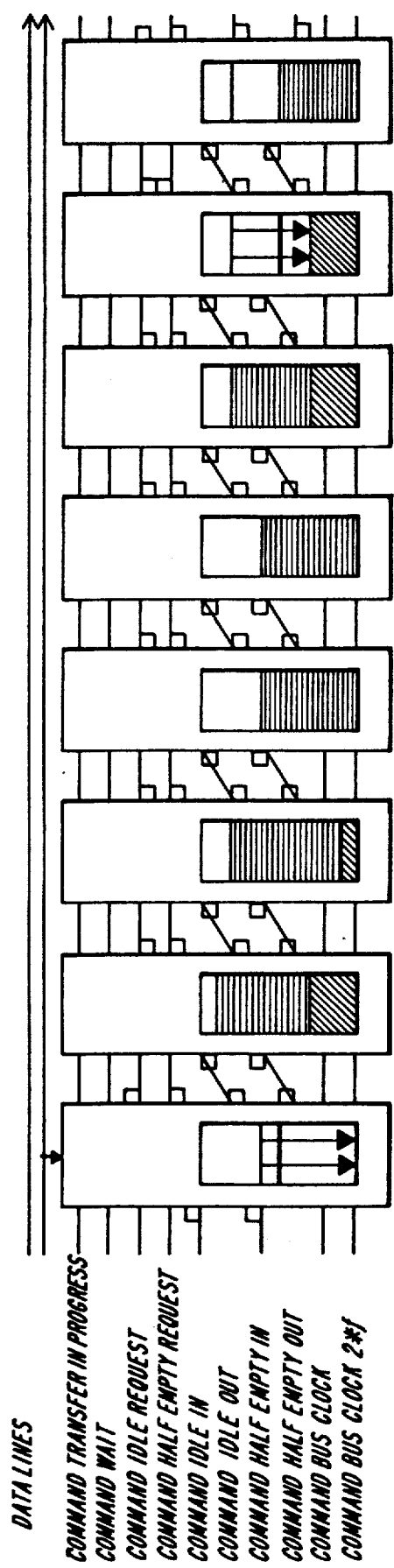

FIG. 4G shows the state of affairs as a new Simultaneous Request Group is formed. It is now possible for the command bus input controller 108 of GAP $6_1$ to assert the Command Idle Request signal 76 and for GAP $6_7$ to assert the Command Half Empty Request signal 80, because during the clock pulse (not shown) immediately following the state as shown in FIG. 4F, no GAP would have asserted a Command Idle Request or a Command Half Empty Request. The process begins again.

Referring again to FIG. 4A, it can be seen that GAP $6_2$ has both an asserted Command Half Empty Request signal 80 and a Command Half Empty In 92 signal, yet GAP $6_2$ does not receive the command, deferring instead to GAP $6_4$, which has asserted its Command Idle Request 76. This is because GAP $6_2$ has not asserted its Command Idle Request 76, however the Command Idle Request Line 76 is asserted because it is wire OR-ed. A GAP does not accept commands if the Command Idle Request Signal 76 is asserted even if it has Command Idle In 84 asserted unless that GAP asserted the signal.

Thus, according to the apparatus described above, the GAPs arbitrate among themselves as to which GAP will receive which commands. The GAP arbitration apparatus works so that the GAPs most ready to receive commands will receive them and GAPs less ready to receive commands will wait to be serviced until more ready GAPs have received commands. As has been mentioned above, this even distribution method assures no GAP having an almost full FIFO 64 will attempt to receive any command and also speeds up the transfer of sequential commands from the GAPs to the image memory unit 22.

The command arbitration apparatus described above achieves efficient use of graphic arithmetic processors. However, it is not enough to merely distribute commands equally among the processors. As has been mentioned above, many commands must be provided to the image memory unit 22 according to a sequence preordained by the display list management processor 30. When all commands are processed by a lone processor, it is no problem to maintain the proper sequence, because the commands flow through the processor in a stream. However, with multiple parallel processors, the commands flow apart like rivulets of a river delta. They must be recombined, as tributaries to a river, in the proper order. Otherwise, all graphics created by the multiple system will be jumbled.

FIG. 5 shows schematically the components that make up a GAP 6. The GAP 6 interfaces with the command bus 14 through the command bus input controller 108 and a 512 register by 34 bit GAP input FIFO 64.

The command bus input controller 108 determines which commands will be clocked into the GAP input FIFO 64, based upon the results of the arbitration among the GAPs discussed above.

A command will be clocked into a GAP's input FIFO 64 if: (1) that GAP has priority and the command is not directed to another specific GAP; (2) if the GAP mode field 218 (shown in FIG. 7) in the header 200 indicates a command for all GAPs; or (3) if the GAP mode 218 and GAP number 214 fields indicate that the command is directed specifically to this GAP.

The command bus input controller 108 also clocks, into the GAP input FIFO, headers for all sequential commands, regardless of whether that GAP won the arbitration. In order to determine which commands and which command headers must be clocked into the GAP input FIFO 64 the command bus input controller 108 monitors every header transfer on the command bus 14. A header transfer occurs on the first edge of a clock (command bus clock line 100 of FIG. 4A) following the assertion of the Command Transfer in Progress signal of line 68 in FIG. 4A.

Figure 7:
FIG. 7 shows schematically the form for a command header.

Commands may also be potentially sequential, which condition is indicated by the field 214 of the command type segment 202 of the header 200 as shown in the FIGS. 6 and 7. Commands are potentially sequential, if their sequentiality depends upon the result of execution by the GAP of previous commands, as discussed below. The headers for potentially sequential commands are also clocked into the GAP input FIFO 64, and evaluated for actual sequentiality by circuitry in the prefetcher 112.

All headers of another special subset of sequential commands are also clocked into the GAP input FIFO 64 for every GAP. These are headers for commands where a response has been requested by the application processor 2, to be returned to it over the VME bus 10.

The command bus input controller 108 also will assert the Command Wait signal 72 (shown in FIG. 4A) if the GAP input FIFO 64 is full as data directed to that GAP comes across the command bus 14. This assertion will cause all GAPs to stop clocking commands into their input FIFO's 64 until the Command Wait signal is de-asserted. It will be de-asserted when the contents of the GAP input FIFO 64 has been reduced.

The command bus input controller 108 also adds two control bits to each word clocked into the GAP input FIFO 64. One control bit is asserted for commands that will be executed by that particular GAP. The other control bit is asserted when the word is a header.

Circuitry of the prefetcher 112 reads command words from the output of the GAP input FIFO 64, increments a command counter 116 if necessary, and sends information, discussed below, to the IMU bus interface 120 and the VME bus interface 124. If the command should be executed by the GAP, the prefetcher 112 transfers the entire command to a processor core 128 for execution. A suitable set of chips for the processor core is available from WEITEK, of Sunnyvale, Calif., under the model designation XL-8032.

Each time a new word is clocked through the output of the GAP input FIFO 64, circuitry of the prefetcher 112 checks whether the word is a header. If it is not a header, the prefetcher 112 passes on the word to the processor core 128 and fetches the next word. If the word is a header, the prefetcher 112 processes each header as discussed below and discards it once the processor core is ready to accept the next word.

The prefetcher determines whether potentially sequential commands are in fact sequential, by evaluating special register bits that are set in the processor core 128. Changes in the core bits are accomplished by commands that have been broadcast to all GAPs. As an example, a polygon command is potentially sequential. Polygons have edges, which are drawn in one color (or value) and insides, which may be drawn in the same color, or a different color. The edge color and inside color are indicated by the core register bits. If the two colors are the same, then a group of overlapping polygons may be drawn in any order because the overlapping will not show and the image will look the same no matter the drawing order. If, however, the two colors differ, drawing order matters to illustrate the overlapping relationship among the polygons. Thus, a command to draw a polygon is potentially sequential. The prefetcher evaluates this condition.

Thus, the prefetcher 112 cannot determine whether potentially sequential commands are in fact sequential until after the processor core 128 has processed any preceding commands that alter the register bits. Therefore, the prefetcher should not fetch the next command until the processor core finishes processing the preceding command, which changed the register bits. One way to accomplish this result is to insert null words in the command stream following commands that change the register bits. Thus, the prefetcher will be occupied with the null word while the processor core alters the register bits, and there will be no risk of making an incorrect sequentiality decision.

If the circuitry of the prefetcher 112 determines the command is not sequential, and the GAP is not designated to process the command, the prefetcher 112 throws away the header and does nothing else with respect to it. If the GAP is to process the command, which begins on the next word following the header, the prefetcher 112 passes the commands on to the core 128.

If the prefetcher 112 determines the command is sequential, it processes the header as discussed below. If the command is also to be executed by this GAP, the prefetcher 112 passes the command on to the core 128 for execution.

An IMU bus interface 120 includes a two bit IMU FIFO 130 used to maintain the sequentiality of the commands transmitted onto the IMU bus 18. The two bit IMU FIFO 130 is 64 registers deep. One bit in each entry indicates whether the command is being executed by this GAP. The other bit indicates whether the command is sequential or not. The use of this two bit IMU FIFO will be described below. The VME bus interface 124 includes a VME FIFO 134 which also is 64 registers deep. However, each entry to the VME FIFO 134 associated with the VME bus is only one bit. This bit also indicates if the command is executed by this GAP.

As prefetcher 112 processes the command headers received from the output of the GAP input FIFO 64, it clocks an entry into the appropriate IMU FIFOs 130 and 134 if the header indicates that the command applies to their respective busses. That is, headers that indicate an image memory unit command will be applied to the two bit IMU FIFO 130. Headers that indicate a response to the application processor 2 along the VME bus will be applied to the one bit VME response FIFO 134. It is possible that a command will spawn both a command to the IMU bus 18 and a response to the VME bus 10. In that case, both IMU FIFO 130 and VME FIFO 134 will receive entries.

Figure 8A:
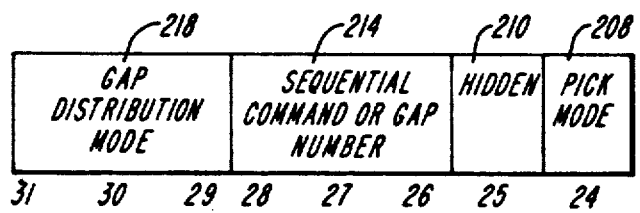
FIG. 8 shows schematically the apparatus for maintaining sequentiality of the drawing commands generated by the group of GAPs. This figure is divided into FIGS. 8A-8F, each showing the sequentiality of the commands at sequential stages during the command execution process.

Referring to FIGS. 8A and 8B, and in particular FIG. 8A, this figure shows schematically entries made by the prefetcher 112 in the IMU FIFO 130 and the GAP output FIFO 138. The entry at the bottom (ID=A in FIG. 8A) is at the output end of the IMU FIFO 130.

The two bit IMU FIFO 130 will contain a series of entries. The entries indicate whether commands are being executed by this GAP (indicated by a 1 in the column titled "This GAP") or not, (indicated by a 0), and whether the commands are sequential (indicated by a 1 in the column titled "Seq?") or not (indicated by a 0). The column titled "ID" does not exist in the actual apparatus, but has been added for this discussion.

FIG. 8A also shows schematically a portion of the GAP output FIFO 138. Again, the column titled "ID" does not exist in the apparatus, but has been added for this discussion.

The processor core 128 may generate a series of image memory unit commands as a result of a single graphics command from the display list management processor 30. The processor core 128 clocks image memory unit commands into the GAP output FIFO 138, which is 36 bits wide and 512 entries deep. Circuitry of the IMU bus output controller 142 matches the entries in the two bit IMU FIFO 130 with the drawing commands in the GAP output FIFO 138. For each series of image memory unit commands in the GAP output FIFO 138 attributable to a single graphics command from the display list management processor 30, there will be an entry in the two bit IMU FIFO 130. For instance referring to FIG. 8A, the entry A (1,1) in the IMU FIFO 120 corresponds to the commands A in the GAPs output FIFO 138. The entry C (1,0) in the IMU FIFO 120 correspond to the commands C. The entry in the output of the two bit IMU FIFO 130, in this case A, will either indicate that it corresponds with a command being executed by this GAP (a 1 in the "This GAP" column) or that it corresponds with a sequential command being executed by another GAP (a 0 in the "This GAP" column, which necessarily is accompanied by a 1 in the "seq?" column). If the output of the two bit IMU FIFO 130 indicates a sequential command being processed by another GAP as far instance shown by entry B in FIG. 8B, then all GAP IMU interfaces 120 must be brought to the same step corresponding to the original display list management processor command stream before the GAP which is executing the sequential command can obtain the IMU bus 18.

Synchronization is accomplished by evaluating a signal on a control line of the IMU, which signal is an open collector signal that is wire ANDed among all the GAPs. When this signal is asserted (high) on the line all GAPs have asserted the signal and have therefore reached the same point in the original display list management processor command stream, which has been tracked by the entries in the two bit IMU FIFO's 130 of all of the GAPs. Once the signal is asserted, the GAP that is executing the sequential command will obtain the IMU bus 18 and transmit its data. After which, it will assert a signal monitored by the IMU bus interfaces which will allow the IMU bus output controller 142 to clock the FIFO entry B (0,1) out of the two bit IMU FIFO 130.

If, rather than indicating a sequential command executed by another GAP (as shown in FIG. 8B), the two bit IMU FIFO 130 output had indicated that this GAP had arrived at a sequential command executed by it (as shown in FIGS. 8A and 8F), which command would therefore be contained in GAP output FIFO 138, for instance at A in FIG. 8A or H in FIG. 8F, then circuitry in the IMU bus output controller 142 of this GAP would have asserted the sequential signal, and after all GAPs had done so, would obtain the bus and transmit the command.

In a third case, as shown in FIG. 8C, the two bit IMU FIFO output 130 might have indicated that there was not at that time pending a sequential command being processed by another GAP, and that the command sequence presently resident in the GAP output FIFO 138 was also not sequential. In that case, circuitry in the IMU bus output controller 120 would have seized the IMU bus 18 and transmitted the data whenever a command block was available.

The VME bus interface 124 functions similarly with respect to responses requested by the applications processor 2, except in this case, all responses are sequential. Referring again to FIG. 5, it can be seen that the processor core 128 communicates directly with VME bus output controller 150. As the prefetcher 112 retrieves words from the GAP input FIFO 64, it determines whether the word is a header that indicates a response command for the VME bus. If so, it clocks an entry into the one bit VME FIFO. If the command is to be executed by this GAP, the entry is a 1. If not, the entry is 0. The prefetcher 112 passes commands to be executed by this GAP to the processor core 128. The processor core processes the command and passes the resulting response to the VME bus output controller 150. Responses are not clocked into the GAP output FIFO 138. Circuitry in the VME bus output controller 150 evaluates the entries in the VME bus FIFO 134 and the signals on the VME bus exactly the same as does the IMU bus controller with the IMU bus. When a response arrives at the VME bus output controller 150, the output controller 150 examines the entry in the VME FIFO 134. If the entry in the output of the VME FIFO 134 indicates that a sequential response must be transmitted by another GAP, the VME controller 150 asserts the signal that it has arrived at a sequential response to be transmitted by another GAP, and waits until the other GAP transmits and signals this VME bus controller 150 to clock the entry out of the VME FIFO 134. If the next entry again indicates a response from another GAP, this controller signals again and waits again.

If the entry indicates the response should be transmitted by this GAP, it signals to the other GAP, that it has a response. When all GAPs arrive at the same point, they will assert a signal. The VME bus output controller 150 will seize the VME bus, transmit the command, and clock the entry out of its VME FIFO 124. All VME bus output controllers on other GAPs will clock out their VME FIFO entries.

During pick mode, the command for every primitive constitutes a command that requires a response to the applications processor 2. Commands requiring responses are sequential. In pick mode, the operator specifies a "pick aperture," which may be an area, if the graphics represents an object in two dimensions, or a volume if the graphics represent an object in three dimensions. The configuration of the pick aperture is broadcast to all GAPs. The display list is traversed again, but no commands to draw an image are sent to the IMU 22,. Instead, as the command corresponding to each primitive is executed, the processor core 128 compares to determine whether the pick aperture intersects the primitive. If so, there has been a "pick hit," which result is communicated to the applications processor by the VME bus controller 124, as discussed above.

The foregoing discussion should be considered to be illustrative and not limiting in any way. For instance, more than eight GAPs could be used. Further, more than 3 priority levels of arbitration could be used, in which case additional signal lines must be provided.

Having described the invention, what is claimed is:

1. An apparatus for generating and manipulating graphic images in accordance with instructions from an operator, transmitted through an input device to a first processor which generates a first, ordered sequence of commands, and sends each command of the first sequence over a command bus to a plurality of graphic arithmetic processors, designated as GAPs, which each has a GAP first in first out (designated as "FIFO") input memory and which GAPs generate together a second sequence of commands that are transmitted over an image memory unit bus (designated as "IMU Bus") to an image memory unit, comprising:
   a. for each GAP a command bus input controller for establishing a plurality of GAP arbitration priority levels corresponding to a plurality of degrees of GAP input FIFO emptiness and for arbitrating among the GAPs so that one GAP which has a GAP input FIFO, as compared to which no other GAP's input FIFO is more empty, receives a command of the first sequence;
   b. for each GAP, means for the command bus input controller to communicate FIFO emptiness signals with the command bus input controller of each other GAP over the command bus; and
   c. means for storing order information for all commands of the first sequence which have not yet been executed; and
   d. for each GAP, means for transmitting commands of the second sequence from said GAP to the image memory unit according to an order based upon the stored order information and substance of the first sequence of commands.

2. The apparatus of claim 1 further wherein:
   a. each GAP comprises means for determining its GAP arbitration priority level and communicating that GAP arbitration priority level to the command bus input controller; and
   b. the command bus further comprises:
      (i) signal lines for conducting among the GAPs clock pulses and control signals; and
      (ii) signal lines for each GAP to generate a signal signifying its GAP arbitration priority level and to receive signals signifying the GAP arbitration priority level of other GAPs at any given clock pulse; and
   c. each command bus input controller further comprises means for preventing each GAP from receiving a command if the GAP receives signals signifying that other GAPs have a higher GAP arbitration priority;

wherein a GAP receives commands only when it has the highest GAP arbitration priority.

3. The apparatus of claim 2 wherein each command bus input controller further comprises means for registering as a member of a group of GAPs (designated as a "simultaneous request group") all GAPs of all priority levels, other than the lowest level, that simultaneously register an arbitration priority level at any given clock pulse.

4. The apparatus of claim 3 wherein each command bus input controller further comprises:
   a. means to register that a particular GAP has received a command of the first sequence; and
   b. means for increasing the GAP arbitration priority levels of all GAPs having lower GAP arbitration priority levels than the then highest, other than the lowest GAP arbitration priority level, once every GAP of the then highest GAP arbitration priority level of a simultaneous request group has registered that it has received a command of the first sequence.

5. The apparatus of claim 4 wherein each command bus input controller further comprises means for establishing among the GAPs that are members of any given GAP arbitration priority level, a second plurality of priority levels of GAP arbitration corresponding only to the number of GAPs in that arbitration priority level (designated as "daisy chain priorities").

6. The apparatus of claim 5 wherein each GAP's command bus input controller further comprises means for constraining its GAP to receive commands of the first sequence only if the GAP has both the then highest GAP arbitration priority level and the then highest daisy chain priority.

7. The apparatus of claim 6 wherein each command bus input controller further comprises means for increasing the daisy chain priority of all GAPs within the then highest GAP arbitration level if the GAP having the then highest daisy chain priority has registered that it has received a command.

8. The apparatus of claim 7 wherein the means of the command bus for increasing the GAP arbitration priority levels of all GAPs having lower GAP arbitration priority levels than the then highest further comprises for each priority level of GAP arbitration, a signal line for carrying to all GAPs a signal that each GAP of the then highest GAP arbitration priority level has registered that it has received a command of the first sequence.

9. The apparatus of claim 8 wherein the signal lines for carrying to all GAPs a signal that each GAP of the then highest GAP arbitration priority level has registered that it has received a command of the first sequence comprises, for each priority level, a signal line having inputs from all GAPs, which are open collector signals that are wire OR-ed.

10. The apparatus of claim 9 wherein:
   a. the means of the command bus for establishing daisy chain priorities comprises, for each level of GAP arbitration priority, a signal line that connects the command bus input controller of each of the GAPs to the command bus input controllers of two other GAPs in a daisy chain (designated as a "daisy chain signal line"), such that the output of the command bus input controller of a GAP is the input to the command bus input controller of the next GAP in the daisy chain; and
   b. the means of each GAP's command bus input controller, for receiving commands of the first sequence only when the GAP has both the then highest GAP arbitration priority level and the then highest daisy chain priority comprises:
      (i) means for accepting an input from and means for delivering an output to each daisy chain signal line;
      (ii) for each daisy chain signal line, means for generating an output to the daisy chain signal line identical to the input from the daisy chain signal line if the GAP's arbitration priority level is other than the priority level of the daisy chain signal line; and
      (iii) for each daisy chain signal line, means for generating an output to the daisy chain signal line indicating that no GAPs further downstream along the daisy chain signal line may receive a command of the first sequence if the downstream GAP's arbitration priority level is the same as the priority level of the daisy chain signal line.

11. The apparatus of claim 1 where each command of the first sequence has a header which indicates whether the commands of the second sequence based on the command of the first sequence associated with the header must be executed sequentially (designated as a "sequential command") or need not be executed sequentially (designated as in "order independent command"), and where each command bus input controller receives from the command bus the commands of the first sequence received by the GAP and the headers of all commands of the first sequence generated by the first processor, including headers of commands not distributed to the GAP, wherein, for each GAP the means for transmitting commands of the second sequence comprises:
   a. a prefetcher processor means for reading the headers of both:
      (i) commands distributed to the GAP; and
      (ii) commands not distributed to the GAP;
   b. a core processor means for accepting as an input from the prefetcher processor means a command of the first sequence distributed to the GAP and generating as output commands of the second sequence;
   c. means for the prefetcher processor means to register if the command of the first sequence indicates that commands of the second sequence based upon the command of the first sequence will be order independent or sequential and if the commands of the second sequence will be generated by the GAP upon which the prefetcher processor resides;
   d. means for transferring commands of the second sequence from the core processor means to an IMU bus output controller; and
   e. means for transmitting commands of the second sequence from the IMU bus output controller onto the IMU bus.

12. The apparatus of claim 11 wherein the means for the prefetcher processor means to register whether the commands of the second sequence will be order independent or sequential and whether the commands of the second sequence will have been generated by the GAP comprises a tap FIFO memory in which the prefetcher processor means makes tag entries corresponding to the commands of the first sequence.

13. The apparatus of claim 12 wherein each GAP further comprising memory means for maintaining a plurality of commands of the second sequence generated by the processor core means.

14. The apparatus of claim 13 wherein for each GAP the IMU bus output controller further comprising means for correlating commands of the second sequence with an entry in the output of the tag FIFO corresponding to the command of the first sequence that was the input to the core processor means in response to which the core processor means generated, as output, the commands of the second sequence.

15. The apparatus of claim 14 wherein the IMU bus comprises means for conducting among the GAPs clock pulses and control signals.

16. The apparatus of claim 15 wherein the memory means for maintaining a plurality of commands of the second sequence comprising a GAP output first in first out ("FIFO") memory.

17. The apparatus of claim 16 wherein for each GAP the IMU bus output controller further comprises:
   a. means for reading the entry in the output of the tag FIFO; and
   b. means for determining whether the commands of the second sequence at the output of the GAP output FIFO are sequential or order independent.

18. The apparatus of claim 17 wherein, for each GAP, the IMU bus output controller further comprises means for seizing the IMU bus and transmitting the commands of the second sequence that correlate with the entry in the output of the tag FIFO.

19. The apparatus of claim 18 wherein, for each GAP, the IMU bus output controller further comprises:
   a. means for placing a signal on the IMU bus signifying that the entry in the output of the tag FIFO correlates to commands of the second sequence that are sequential;

b. means for receiving signals transmitted over the IMU bus by all other GAPs; and means for determining from the signals received when every GAP has in the output of its tag FIFO an entry correlating to a sequential command of the second sequence; and d. means for waiting until it receives signals over the IMU bus signifying that for every other GAP, the entry in the output of the tag FIFO of every other GAP corresponds to a sequential command and then;

(i) if the entry in the tag FIFO of the GAP correlates to commands of the second sequence that were generated by the GAP, A. seizing the IMU bus and transmitting the commands of the second sequence correlated to the entry in the output of the tag FIFO; and B. clocking the entry in the output of the tag FIFO out of the tag FIFO; and (ii) if the entry in the tag FIFO of the GAP correlates to commands of the second sequence that were generated by another GAP, clocking the entry in the output of the tag FIFO out of the tag FIFO.

20. A method for generating and manipulating graphic images in accordance with instructions from an operator, transmitted through an input device to a first processor which generates a first, ordered sequence of commands, and sends the commands over a command bus to a plurality of graphic arithmetic processors, designated as GAPs, which each has a GAP first in first out (designated as "FIFO") input memory and which GAPs generate together a second sequence of commands that are transmitted over an image memory unit (designated as "IMU") bus to an image memory unit, comprising the steps of:

a. distributing commands of the first sequence from the first processor among the plurality of GAPs so that each GAP processes commands for a time substantially equal to the time every other GAP process commands; and b. storing order information for all commands of the first sequence which have not yet been executed; and c. transmitting commands of the second sequence from the GAPs to the image memory unit according to an order based upon the stored order information and substance of the first sequence of commands.

21. The method of claim 20 wherein the step of distributing commands among the GAPs further comprises the steps of establishing a plurality of priority levels of GAP arbitration corresponding to a plurality of degrees of GAP input FIFO emptiness and causing the GAPs to arbitrate among themselves such that one GAP which has a GAP input FIFO, as compared to which no other GAP's input FIFO is more empty, receives the next available command.

22. The method of claim 20 where each command of the first sequence has a header, the method further comprising the steps of:

a. indicating in the header of a command of the first sequence whether the commands of the second sequence generated in response to the command of the first sequence associated with the header must be executed sequentially (designated as a "sequential command") or need not be executed sequentially (designated as an "order independent command");

b. each GAP recording:
(i) the commands of the first sequence distributed to the GAP; and
(ii) the headers of all commands of the first sequence generated by the first processor, including headers of commands not distributed to the GAP;

c. each GAP reading the headers of both:
(i) commands distributed to the GAP; and
(ii) commands not distributed to the GAP;

d. accepting as an input to a core processor, a command of the first sequence distributed to the GAP and generating as output from said core processor commands of the second sequence;

e. each GAP registering whether the commands of the second sequence will be order independent or sequential and whether the commands of the second sequence will have been generated by the GAP;

f. transferring commands of the second sequence from the core processor to an IMU bus output controller; and g. transmitting from each GAP commands of the second sequence onto the IMU bus.

23. The method of claim 22 further comprising the step of making entries in a tag FIFO memory corresponding to the commands of the first sequence.

24. The method of claim 23, further comprising the step of maintaining in a memory on each GAP, a plurality of commands of the second sequence generated by the core processor.

25. The method of claim 24, further comprising the step of, correlating commands of the second sequence at each GAP with an entry in the output of the tag FIFO corresponding to the command of the first sequence that was the input to the core processor in response to which the core processor generated, as output, the commands of the second sequence.

26. The method of claim 25 further comprising the step of conducting among the GAPs clock pulses and signals.

27. The method of claim 26, further comprising the steps of:

a. each GAP reading the entry in the output of the tag FIFO; and b. each GAP determining whether the commands of the second sequence at the output of the GAP output FIFO are sequential.

28. The method of claim 27 further comprising, in each GAP, the steps of seizing the IMU bus and transmitting the commands of the second sequence that correlate with the entry in the output of the tag FIFO.

29. The method of claim 28 further comprising, in each GAP, the steps of a. placing a signal on the IMU bus signifying that the entry in the output of the tag FIFO correlates to commands of the second sequence that are sequential;

b. receiving signals transmitted over the IMU bus by all other GAPs;

c. determining from the signals received whether every GAP has in the output of its tag FIFO an entry correlated to a sequential command of the second sequence; and d. waiting until receiving a signal over the IMU bus signifying that for every other GAP, the entry in the output of the tag FIFO of every other GAP corresponds to a sequential command;
   (i) if the entry in the tag FIFO of the GAP correlates to commands of the second sequence that were generated by the GAP:
      A. seizing the IMU bus and transmitting the commands of the second sequence correlated to the entry in the output of the tag FIFO; and
      B. clocking the entry in the output of the tag FIFO out of the tag FIFO; and
   (ii) if the entry in the tag FIFO of the GAP correlates to commands of the second sequence that were generated by another GAP, clocking the entry in the output of the tag FIFO out of the tag FIFO.

30. An apparatus for generating and manipulating graphic images in accordance with instructions from an operator, transmitted through an input device to a first processor which generates a first, ordered sequence of commands, and sends the commands over a command bus to a plurality of graphic arithmetic processors, designated as GAPs, which GAPs generate together a second sequence of commands that are transmitted over an image memory unit bus (designated as "IMU Bus") to an image memory unit, comprising means for storing order information for all commands of the first sequence which have not yet been executed and means for transmitting commands of the second sequence from the GAPs to the image memory unit according to an order based upon the stored order information and substance of the first sequence of commands.

31. The apparatus of claim 30 wherein said means for transmitting commands of the second sequence are distributed among the GAFs, in separate units, wherein the unit residing on each GAP comprises:
   a. means for placing signals onto the IMU bus, which signals indicate if the commands of the second sequence generated by the GAP upon which the unit resides are order dependent; and
   b. means for receiving signals from the IMU bus, which signals indicate if the commands of the second sequence generated by the other GAPS upon which the unit does not reside are order dependent.

* * * * *